US010551546B2

(12) United States Patent
Fattal

(10) Patent No.: US 10,551,546 B2
(45) Date of Patent: Feb. 4, 2020

(54) MULTIBEAM DIFFRACTION GRATING-BASED DISPLAY WITH HEAD TRACKING

(71) Applicant: LEIA INC., Menlo Park, CA (US)

(72) Inventor: David A. Fattal, Mountain View, CA (US)

(73) Assignee: LEIA INC., Menlo Park, CA (US)

( * ) Notice: Subject to any disclaimer, the term of this patent is extended or adjusted under 35 U.S.C. 154(b) by 158 days.

(21) Appl. No.: 15/911,144

(22) Filed: Mar. 4, 2018

(65) Prior Publication Data

US 2018/0188441 A1 Jul. 5, 2018

Related U.S. Application Data

(63) Continuation of application No. PCT/US2016/050320, filed on Sep. 4, 2016.

(60) Provisional application No. 62/214,979, filed on Sep. 5, 2015.

(51) Int. Cl.
*F21V 8/00* (2006.01)
*G02B 27/00* (2006.01)
*H04N 13/366* (2018.01)

(52) U.S. Cl.
CPC ......... *G02B 6/0038* (2013.01); *G02B 6/0058* (2013.01); *G02B 27/0093* (2013.01); *H04N 13/366* (2018.05)

(58) Field of Classification Search
CPC ............... G02B 6/0038; G02B 6/0058; G02B 27/0093; H04N 13/366
USPC ....................................................... 362/611
See application file for complete search history.

(56) References Cited

U.S. PATENT DOCUMENTS

| 4,711,512 A | 12/1987 | Upatnieks |
| 7,499,216 B2 * | 3/2009 | Niv ..................... G02B 27/0172 359/566 |
| 8,384,861 B2 | 2/2013 | Jepsen |
| 9,128,226 B2 | 9/2015 | Fattal et al. |

(Continued)

FOREIGN PATENT DOCUMENTS

| WO | 2012038856 A1 | 3/2012 |
| WO | 2014055243 A2 | 4/2014 |
| WO | 2015016844 A1 | 2/2015 |

OTHER PUBLICATIONS

International Search Report (ISR) from the International Searching Authority (ISA/KR) dated Nov. 29, 2016 (3 pages) for counterpart parent PCT Application No. PCT/US2016/050320.

(Continued)

*Primary Examiner* — Bryon T Gyllstrom
(74) *Attorney, Agent, or Firm* — J. Michael Johnson

(57) ABSTRACT

A head-tracking multiview display and a system provide a plurality of views of a scene as a multiview image. The plurality of views includes a set of primary views of the scene and a secondary view representing a perspective view of the scene that is angularly adjacent to the primary view set. The display and system are multibeam diffraction grating-based and configured to selectively provide the primary view set and an augmented set of views that includes the secondary view and a subset of the views of the primary view set based on a tracked position of a user or a user's head. At a first position the display is configured to provide the primary view set and at a second position the display is configured to provide the augmented view set.

20 Claims, 7 Drawing Sheets

(56) References Cited

U.S. PATENT DOCUMENTS

| | | | |
|---|---|---|---|
| 9,298,168 B2 | 3/2016 | Taff et al. | |
| 9,389,415 B2 | 7/2016 | Fattal et al. | |
| 9,459,461 B2 | 10/2016 | Santori et al. | |
| 9,535,253 B2* | 1/2017 | Levola | G02B 27/0172 |
| 9,557,466 B2 | 1/2017 | Fattal | |
| 9,785,119 B2 | 10/2017 | Taff et al. | |
| 9,791,701 B2 | 10/2017 | Ato et al. | |
| 2001/0046142 A1* | 11/2001 | Van Santen | G02B 6/0038 |
| | | | 362/561 |
| 2004/0108971 A1* | 6/2004 | Waldern | G02B 27/0093 |
| | | | 345/8 |
| 2009/0040426 A1 | 2/2009 | Mather et al. | |
| 2010/0002295 A1* | 1/2010 | Kimpe | G02B 27/2214 |
| | | | 359/465 |
| 2011/0141395 A1* | 6/2011 | Yashiro | G02B 6/0036 |
| | | | 349/62 |
| 2011/0310092 A1 | 12/2011 | de la Barre | |
| 2011/0310233 A1* | 12/2011 | Bathiche | H04N 13/32 |
| | | | 348/51 |
| 2013/0077154 A1* | 3/2013 | Popovich | G02B 27/2214 |
| | | | 359/316 |
| 2013/0286170 A1 | 10/2013 | Qin et al. | |
| 2013/0329301 A1 | 12/2013 | Travis | |
| 2014/0247330 A1* | 9/2014 | Baik | H04N 5/23219 |
| | | | 348/51 |
| 2014/0300840 A1* | 10/2014 | Fattal | G02F 1/133615 |
| | | | 349/15 |
| 2015/0077526 A1* | 3/2015 | Kim | H04N 13/376 |
| | | | 348/51 |
| 2015/0226965 A1 | 8/2015 | Kim et al. | |
| 2015/0355403 A1 | 12/2015 | Santori et al. | |
| 2017/0363794 A1 | 12/2017 | Wan et al. | |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

* cited by examiner

MULTIBEAM DIFFRACTION GRATING-BASED DISPLAY WITH HEAD TRACKING

CROSS-REFERENCE TO RELATED APPLICATIONS

This application is a continuation patent application of and claims the benefit of priority to International Application No. PCT/US2016/050320, filed Sep. 4, 2016, which claims priority to U.S. Provisional Patent Application Ser. No. 62/214,979, filed Sep. 5, 2015, the entirety of which are incorporated by reference herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the limitations of passive displays associated with emitted light, many passive displays are coupled to an external light source. The coupled light source may allow these otherwise passive displays to emit light and function substantially as an active display. Examples of such coupled light sources are backlights. A backlight may serve as a source of light (often a panel backlight) that is placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide a multiview or three-dimensional (3D) image display that employs user location or 'head-tracking'. Embodiments consistent with the principles described herein may employ a multiview display to provide different sets of views of a scene represented by a multiview image depending on a location of a user. In particular, a set of primary views may be provided when a user is located in a first position. The primary set of views is configured to provide a multiview image to the user within a range of viewing angles. Further, an augmented set of views may be provided when the user moves to or is located in a second position. The augmented view set includes a subset of the primary views and a secondary view. The secondary view represents a perspective or view direction of the scene that is angularly adjacent to but substantially beyond an angular range of the primary set of views. Providing different view sets corresponding to different locations of a user may increase an effective angular field-of-view (FOV) of a multiview image being displayed. The increased angular FOV may reduce or mitigate so-called 'jumps' or 'inverted views' of multiview or three-dimensional (3D) image perception that may occur when viewing a multiview image at an oblique angle, for example.

In various embodiments, head tracking may provide the position or location of the user to the multiview display. That is, the user location may be determined or inferred by tracking a location of a user's head. As such, to facilitate discussion and not by way of limitation, embodiments described herein may be referred to as 'head-tracking' multiview displays, systems and methods that employ head tracking, for example.

Figure 1A:
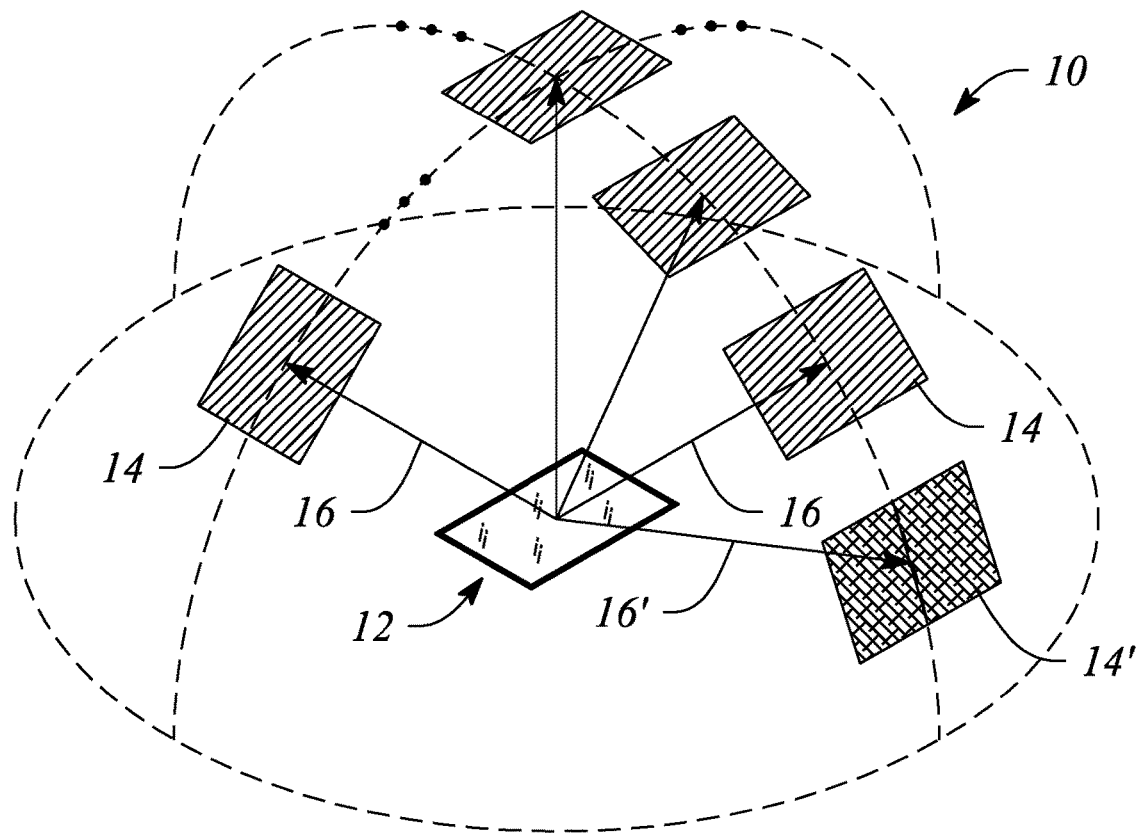
FIG. 1A illustrates a perspective view of a multiview display in an example, according to an embodiment consistent with the principles described herein.

Herein, a 'multiview display' is defined as an electronic display or display system configured to provide different views of a multiview image in different view directions. FIG. 1A illustrates a perspective view of a multiview display 10 in an example, according to an embodiment consistent with the principles described herein. As illustrated in FIG. 1A, the multiview display 10 comprises a screen 12 to display a multiview image to be viewed. The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14. FIG. 1A also illustrates a 'secondary' view 14'. The illustrated secondary view 14' represents a perspective of the scene, or equivalently has a secondary view direction 16', that is angularly adjacent to but substantially beyond an angular range of the views 14 (i.e., a primary set of views 14).

Figure 1B:
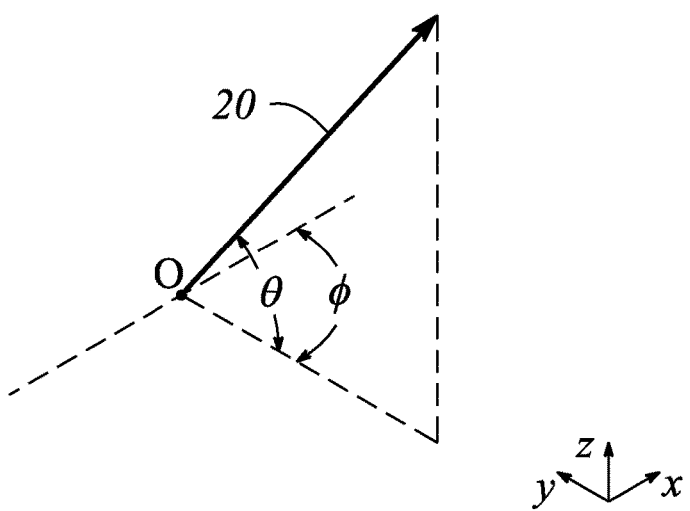
FIG. 1B illustrates a graphical representation of angular components of a light beam having a particular principal angular direction corresponding to a view direction of a multiview display in an example, according to an embodiment consistent with the principles described herein.

A view direction or equivalently, a light beam having a direction corresponding to a view direction of a multiview display generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\phi$ is an angle in a horizontal plane (e.g., parallel to the multiview display screen plane). FIG. 1B illustrates a graphical representation of the angular components $\{\theta, \phi\}$ of a light beam 20 having a particular principal angular direction corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays include more than two views, by definition herein, multiview images may be viewed (i.e., on a multiview display) as a stereoscopic pair of images by selecting only two of the multiview views to view at a time (i.e., one view per eye).

A 'multiview pixel' is defined herein as a set of sub-pixels representing 'view' pixels in each of a similar plurality of different views of a multiview display. In particular, a multiview pixel may have an individual sub-pixel corresponding to or representing a view pixel in each of the different views of the multiview image. Moreover, the sub-pixels of the multiview pixel are so-called 'directional pixels' in that each of the sub-pixels is associated with a predetermined view direction of a corresponding one of the different views, by definition herein. Further, according to various examples and embodiments, the different view pixels represented by the sub-pixels of a multiview pixel may have equivalent or at least substantially similar locations or coordinates in each of the different views. For example, a first multiview pixel may have individual sub-pixels corresponding to view pixels located at $\{x_1, y_1\}$ in each of the different views of a multiview image, while a second multiview pixel may have individual sub-pixels corresponding to view pixels located at $\{x_2, y_2\}$ in each of the different views, and so on.

In some embodiments, a number of sub-pixels in a multiview pixel may be equal to a number of views of the multiview display. For example, the multiview pixel may provide sixty-four (64) sub-pixels in associated with a multiview display having 64 different views. In another example, the multiview display may provide an eight by four array of views (i.e., thirty-two (32) views) and the multiview pixel may include thirty-two 32 sub-pixels (i.e., one for each view). Additionally, each different sub-pixel may have an associated direction (i.e., light beam principal angular direction) that corresponds to a different one of the view directions, for example, corresponding to the 64 different views, or corresponding to the 32 different views, in the above examples. Further, according to some embodiments, a number of multiview pixels of the multiview display may be substantially equal to a number of 'view' pixels (i.e., pixels that make up a selected view) in the multiview display views. For example, if a view includes six hundred forty by four hundred eighty view pixels (i.e., a 640×480 view resolution), the multiview display may have three hundred seven thousand two hundred (307,200) multiview pixels. In another example, when the views include one hundred by one hundred view pixels, the multiview display may include a total of ten thousand (i.e., 100×100=10,000) multiview pixels.

Herein, a 'light guide' is defined as a structure that guides light within the structure using total internal reflection. In particular, the light guide may include a core that is substantially transparent at an operational wavelength of the light guide. The term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to insure that total internal reflection is maintained within the plate light guide to guide light.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the diffraction grating may include a plurality of features (e.g., a plurality of grooves or ridges in a material surface) arranged in a one-dimensional (1D) array. In other examples, the diffraction grating may be a two-dimensional (2D) array of features. The diffraction grating may be a 2D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a material surface (i.e., a boundary between two materials). The surface may be a surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

According to various examples described herein, a diffraction grating (e.g., a diffraction grating of a multibeam diffraction grating, as described below) may be employed to diffractively scatter or couple light out of a light guide (e.g., a plate light guide) as a light beam. In particular, a diffraction angle $\theta_m$ of or provided by a locally periodic diffraction grating may be given by equation (1) as:

$$\theta_m = \sin^{-1}\left(n\sin\theta_i - \frac{m\lambda}{d}\right) \qquad (1)$$

where $\lambda$ is a wavelength of the light, m is a diffraction order, n is an index of refraction of a light guide, d is a distance or spacing between features of the diffraction grating, $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer. A diffraction angle $\theta_m$ of a light beam produced by the diffraction grating may be given by equation (1) where the diffraction order is positive (e.g., m>0). For example, first-order diffraction is provided when the diffraction order m is equal to one (i.e., m=1).

Figure 2:
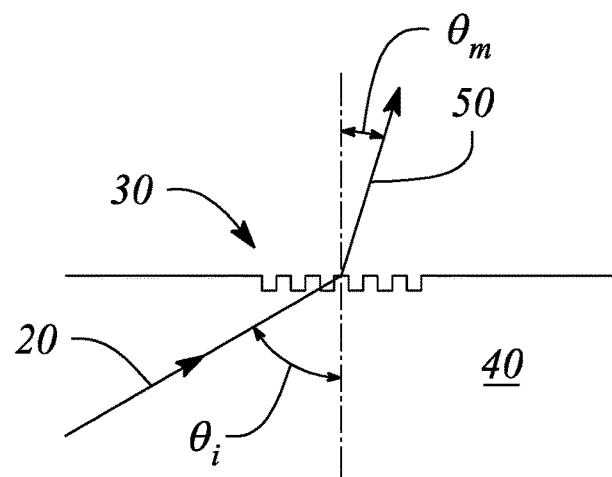
FIG. 2 illustrates a cross sectional view of a diffraction grating in an example, according to an embodiment consistent with the principles described herein.

FIG. 2 illustrates a cross sectional view of a diffraction grating 30 in an example, according to an embodiment consistent with the principles described herein. For example, the diffraction grating 30 may be located on a surface of a light guide 40. In addition, FIG. 2 illustrates a light beam 20 incident on the diffraction grating 30 at an incident angle $\theta_i$. The light beam 20 is guided light (e.g., a guided light beam)

within the light guide 40. Also illustrated in FIG. 2 is a coupled-out light beam 50 diffractively produced and coupled-out by the diffraction grating 30 as a result of diffraction of the incident light beam 20. The coupled-out light beam 50 has a diffraction angle $\theta_m$ (or 'principal angular direction' herein) as given by equation (1). The diffraction angle $\theta_m$ may correspond to a diffraction order 'm' of the diffraction grating 30, for example.

By definition herein, a 'multibeam diffraction grating' is a structure or element of a backlight or a display that produces light that includes a plurality of light beams. Further, the light beams of the plurality of light beams produced by a multibeam diffraction grating have different principal angular directions from one another, by definition herein. In particular, by definition, a light beam of the plurality has a predetermined principal angular direction that is different from another light beam of the light beam plurality. Furthermore, the light beam plurality may represent a light field. For example, the light beam plurality may be confined to a substantially conical region of space or have a predetermined angular spread that includes the different principal angular directions of the light beams in the light beam plurality. As such, the predetermined angular spread of the light beams in combination (i.e., the light beam plurality) may represent the light field.

According to various embodiments, the different principal angular directions of the various light beams of the plurality are determined by a combination of a grating pitch or spacing and an orientation or rotation of the diffractive features of the multibeam diffraction grating at points of origin of the respective light beams relative to a propagation direction of the light incident on the multibeam diffraction grating. Further, a light beam produced by the multibeam diffraction grating has a principal angular direction given by angular components $\{\theta, \phi\}$, by definition herein, and as described above with respect to FIG. 1B.

Herein a 'collimator' is defined as substantially any optical device or apparatus that is configured to collimate light. For example, a collimator may include, but is not limited to, a collimating mirror or reflector, a collimating lens, or various combinations thereof. In some embodiments, the collimator comprising a collimating reflector may have a reflecting surface characterized by a parabolic curve or shape. In another example, the collimating reflector may comprise a shaped parabolic reflector. By 'shaped parabolic' it is meant that a curved reflecting surface of the shaped parabolic reflector deviates from a 'true' parabolic curve in a manner determined to achieve a predetermined reflection characteristic (e.g., a degree of collimation). A collimating lens may comprise a spherically shaped surface (e.g., a biconvex spherical lens).

According to various embodiments, an amount of collimation provided by the collimator may vary in a predetermined degree or amount from one embodiment to another. Further, the collimator may be configured to provide collimation in one or both of two orthogonal directions (e.g., a vertical direction and a horizontal direction). That is, the collimator may include a shape in one or both of two orthogonal directions that provides light collimation, according to some embodiments.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

Further, as used herein, the article 'a' is intended to have its ordinary meaning in the patent arts, namely 'one or more'. For example, 'a multibeam diffraction grating' means one or more multibeam diffraction gratings and as such, 'the multibeam diffraction grating' means 'the multibeam diffraction grating(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3:
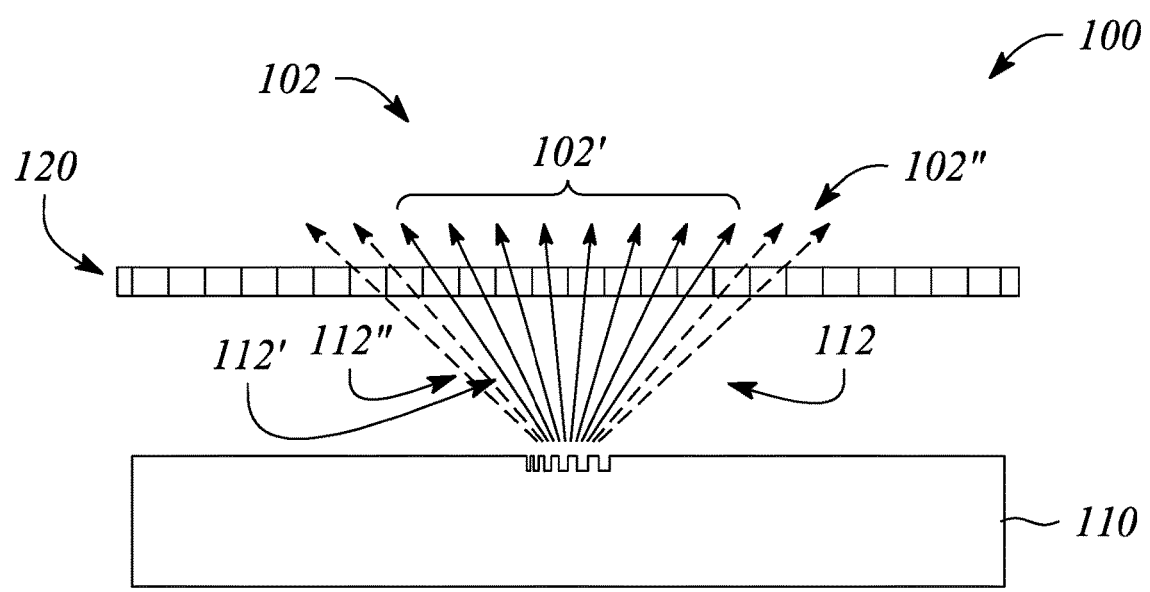
FIG. 3 illustrates a cross sectional view of a head-tracking multiview display in an example, according to an embodiment consistent with the principles described herein.

According to some embodiments of the principles described herein, a head-tracking multiview display is provided. FIG. 3 illustrates a cross sectional view of a head-tracking multiview display 100 in an example, according to an embodiment consistent with the principles described herein. The head-tracking multiview display 100 is configured to provide a plurality of views of a scene as a multiview image, i.e., a displayed multiview image. In particular, the plurality of views is provided in a corresponding plurality of view directions by the head-tracking multiview display 100. In FIG. 3, the view directions or equivalently the views of the view plurality are depicted as arrows 102 pointing in different angular directions that extend from the head-tracking multiview display 100.

According to various embodiments, the view plurality provided by the head-tracking multiview display 100 comprises a set of primary views. For example, solid-line arrows 102' in FIG. 3 may represent the set of primary views or equivalently a set of directions of the primary views. The view plurality provided by the head-tracking multiview display 100 further comprises a secondary view in a secondary view direction. For example, dashed-line arrows 102" in FIG. 3 may represent the secondary view or secondary view directions. According to various embodiments and by definition herein, the secondary view represents a perspective or view direction of the scene that is angularly adjacent to but substantially beyond an angular range of the primary set of views. In particular, the secondary view corresponds to a view direction having an view angle that is outside of an angular range subtended by the primary view set by definition herein, e.g., the angular range subtended by the solid-line arrows 102' in FIG. 3. In some embodiments, the head-tracking multiview display 100 may provide a plurality of secondary views. According to various embodiments, the head-tracking multiview display 100 is configured to selectively provide either the primary view set or an augmented set of views. The augmented set of views comprises the secondary view and a subset of views of the primary view set.

Referring to FIG. 3, the illustrated head-tracking multiview display 100 comprises a multibeam diffraction grating-based backlight 110. The multibeam diffraction grating-based backlight 110 is configured to provide a plurality of light beams 112 having different principal angular directions. In particular, the light beams 112 may have different principal angular directions corresponding to the different view directions of the head-tracking multiview display 100 or equivalently of the multiview image that is to be displayed by the head-tracking multiview display 100. For example, the arrows 102 in FIG. 3 may also represent the light beams 112 provided by the multibeam diffraction grating-based backlight 110 or equivalently the different principal angular directions of the light beams 112 corresponding to the different view directions.

Further, as illustrated in FIG. 3, the plurality of light beams 112 includes a first set of light beams 112' and a second set of light beams 112". In FIG. 3, the first set of light beams 112' are depicted using solid-line arrows (i.e., solid-line arrows 102') and the second set of light beams 112" are depicted using dashed-line arrows (i.e., dashed-line arrows 102"). The first set of light beams 112' represents light beams 112 of the light beam plurality having principal angular directions corresponding to view directions of the set of primary views. The second set of light beams 112" represents light beams 112 of the light beam plurality having principal angular directions corresponding to various secondary view directions of the head-tracking multiview display 100, for example.

The head-tracking multiview display 100 illustrated in FIG. 3 further comprises a light valve array 120. In various embodiments, any of a variety of different types of light valves may be employed as light valves of the light valve array 120 including, but not limited to, one or more of liquid crystal light valves, electrophoretic light valves, and light valves based on electrowetting.

The light valve array 120 is configured to modulate the plurality of light beams 112 to provide the views of the scene as the multiview image. In particular, the light valve array 120 is configured to modulate the light beams 112 and to selectively provide the primary view set and the augmented view set including the secondary view. According to various embodiments, selection between providing the primary view set and the augmented view set is based on a location of a user or viewer of the head-tracking multiview display 100. For example, selection of the view set may be based on a location of a user's head relative to the head-tracking multiview display 100. Selection of the view set may be controlled by a driver (e.g., driver circuit) of the light valve array 120 under direction of a processor (e.g., a graphics processor unit) or similar circuit, for example.

Figure 4A:
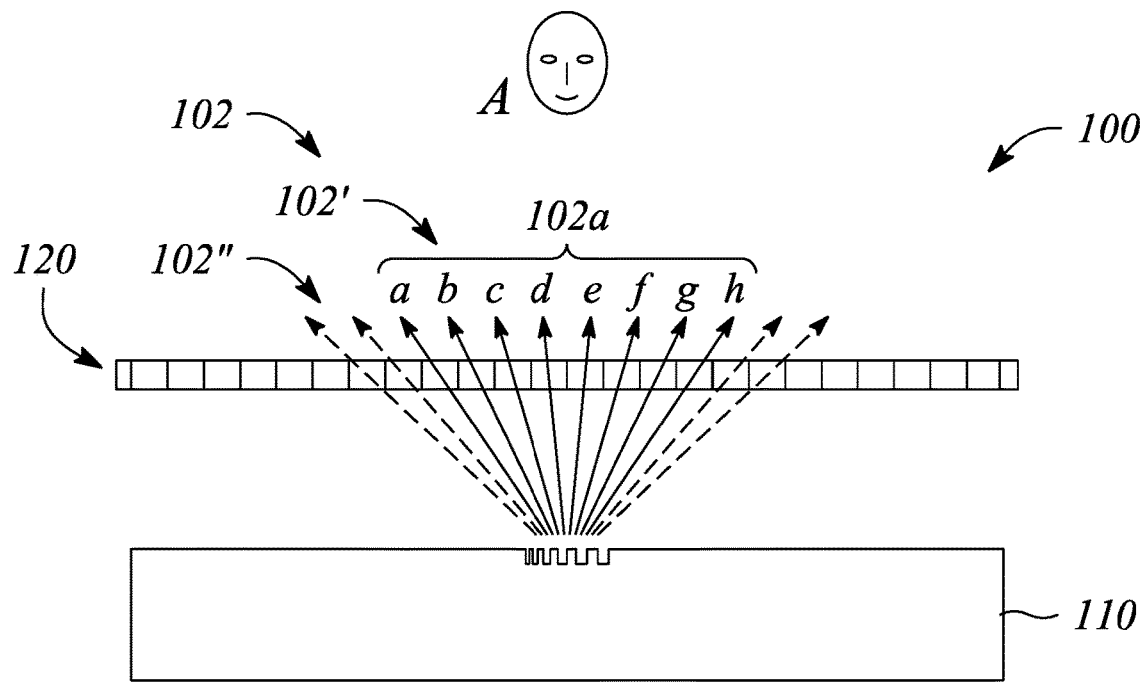
FIG. 4A illustrates a cross sectional view of a head-tracking multiview display in an example, according to an embodiment consistent with the principles described herein.
Figure 4B:
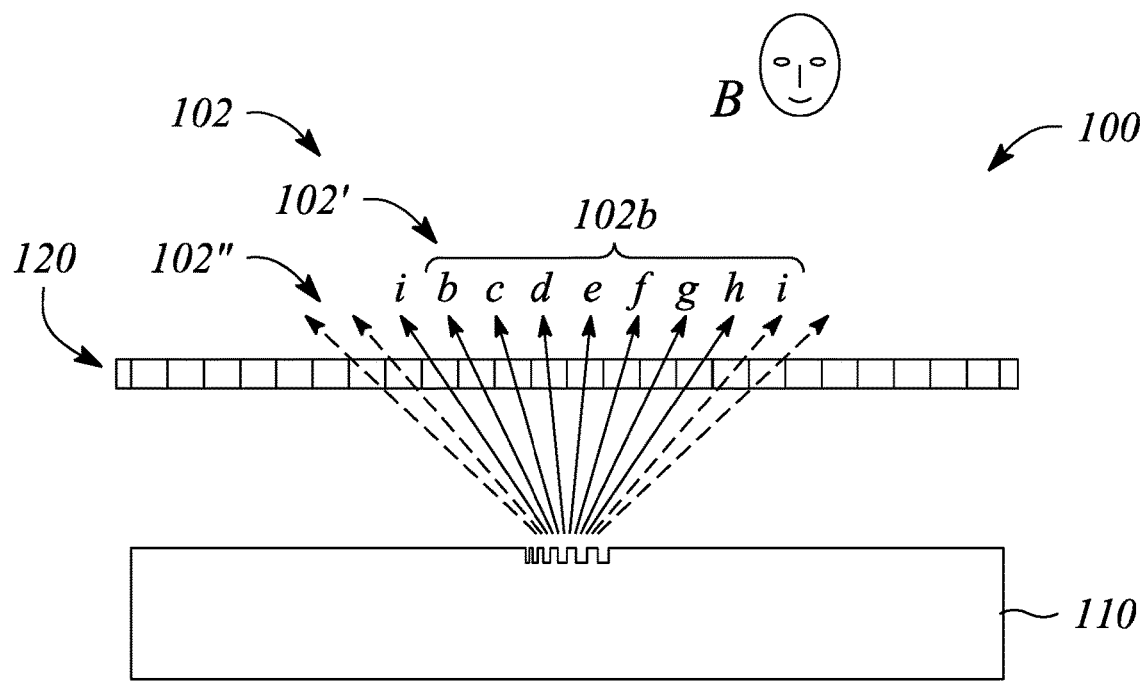
FIG. 4B illustrates a cross sectional view of the head-tracking multiview display of FIG. 4A in another example, according to an embodiment consistent with the principles described herein.

FIG. 4A illustrates a cross sectional view of a head-tracking multiview display 100 in an example, according to an embodiment consistent with the principles described herein. FIG. 4B illustrates a cross sectional view of the head-tracking multiview display 100 of FIG. 4A in another example, according to an embodiment consistent with the principles described herein. The head-tracking multiview display 100 illustrated in FIGS. 4A and 4B comprises the multibeam diffraction grating-based backlight 110 and the light valve array 120, e.g., as described above for FIG. 3. In particular, FIG. 4A illustrates the head-tracking multiview display 100 configured to selectively provide a primary set of views 102a. FIG. 4B illustrates the head-tracking multiview display 100 configured to selectively provide an augmented set of views 102b. FIG. 4A also illustrates a user (or a user's head) in a first location A and FIG. 4B also illustrates the user or user's head in a second location B relative to the head-tracking multiview display 100. The location or position of the user (or user's head) is trackable or being tracked, e.g., as further described herein.

As described above with respect to FIG. 3, various views or equivalently view directions of both the primary view set 102a and the augmented view set 102b are represented by arrows 102. Specifically in FIGS. 4A and 4B, solid-line arrows 102' represent the views or equivalently the view directions of the primary view set 102a and a dashed-line arrow 102" represents the secondary view or equivalently the secondary view direction, e.g., within the augmented view set 102b. In addition, in FIGS. 4A-4B, the various views or view directions are identified by letters that increase sequentially from left to right, where the letter 'a' represents a first view, the letter 'b' represents a second view, and so on. As illustrated, the primary view set 102a includes eight (8) views labeled 'a' through 'h' in FIG. 4A. The secondary view represents a ninth view of the scene and is labeled 'i' in FIG. 4B.

As illustrated in FIG. 4A, the head-tracking multiview display 100 may selectively display the primary view set 102a (i.e., solid-line arrows 102' labeled 'a' through 'h') when a user is located in the first position A. The first position A may be a region substantially in front of the head-tracking multiview display 100, for example. When the user is in the first position A, the user may see a 'normal' multiview image of the scene (e.g., a '3D image') as displayed by the head-tracking multiview display 100, for example. In particular, the 'normal' or 'front-facing' multiview image is defined to include the primary view set 102a, which in turn includes views labeled 'a' through 'h', as illustrated in FIG. 4A.

As illustrated in FIG. 4B, the head-tracking multiview display 100 may selectively display the augmented view set 102b when a user is located in the second position B. In particular, FIG. 4B illustrates the user having moved or being located in the second position B. The second position 'B' may be substantially off to a side (i.e., 'off-side') of the head-tracking multiview display 100, for example, as illustrated in FIG. 4B. The augmented view set 102b, as illustrated, comprises a subset of seven (7) of the views of the primary view set 102a (i.e., solid-line arrows 102' 'b'-'h') and a secondary view 'i' (i.e., a dashed-line arrow 102" labeled 'i') in the direction of the user's off-side location. The augmented view set 102b includes both a subset of the primary views (i.e., the subset excluding 'a') and the secondary view i in order to facilitate a view of the multiview image from the off-side user location relative to the head-tracking multiview display 100.

In particular, the head-tracking multiview display 100, according to the principles described herein, provides to the user, when in the second position B, an ability to see a portion of the scene in the multiview image from a perspective (i.e., the perspective represented by the secondary view) other than the perspective present in the primary view set 102a (position A) as a result of the inclusion of the secondary view (i.e., 'b' through 'i' in the direction of position B) in the augmented view set 102b. Moreover, the inclusion of the secondary view provided by the head-tracking multiview display 100, according to the principles described herein, may reduce or even substantially eliminate so-called 'jumps' that may occur when a multiview image is viewed by the user from an angle that is substantially beyond the 'normal' or front-facing viewing angle of the head-tracking multiview display 100, for example. Note that, while the location of the user is described herein with respect to a first position and a second position, the scope of the principles described herein are not limited to only two positions of the user (or equivalently the user's head). The scope of the principles herein is intended to include any number of different positions of the user of the head-tracking multiview display 100.

According to various embodiments of the principles described herein, the head-tracking multiview display 100 may comprise substantially any multibeam diffraction grating-based backlight. In particular, any backlight having a multibeam diffraction grating configured to provide the plurality of light beams 112 having different principal angular directions corresponding to different view directions of a multiview image may be used, according to various embodiments. For example, the head-tracking multiview display 100 may comprise a multibeam diffraction grating-based backlight 110 that includes a light guide and a plurality of multibeam diffraction gratings, as described below.

Figure 5:
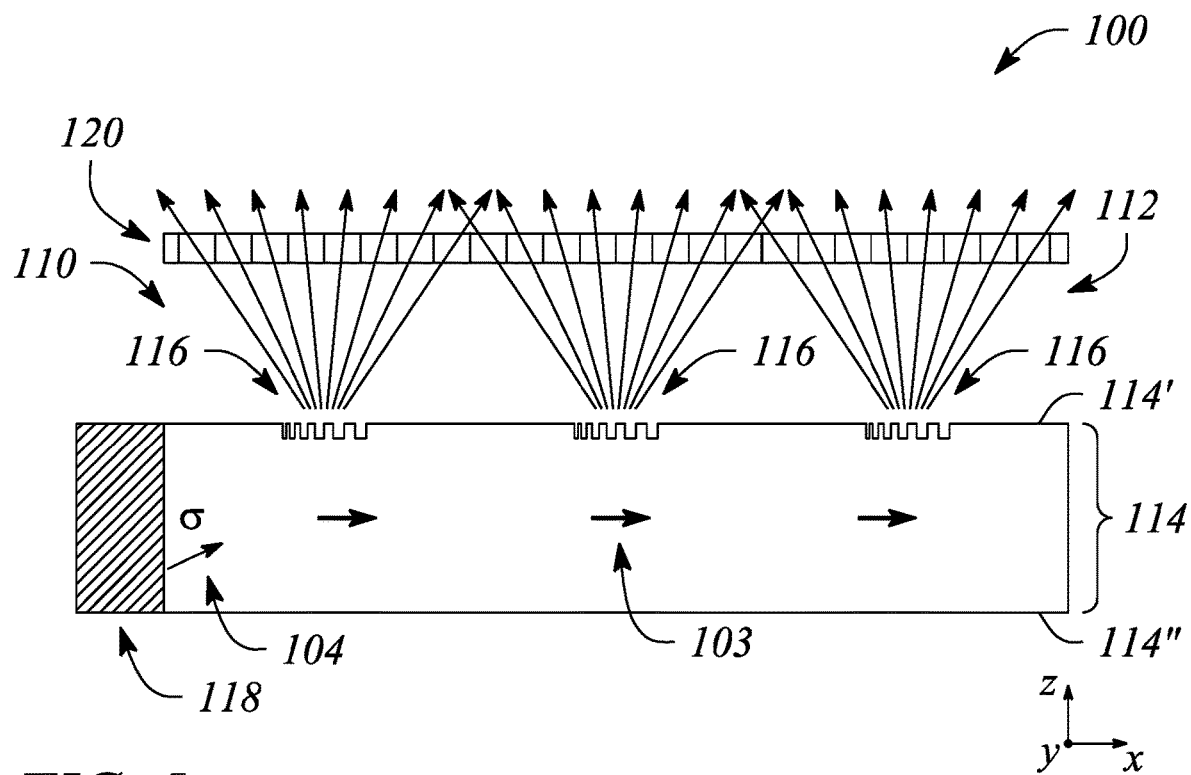
FIG. 5 illustrates a cross sectional view of a head-tracking multiview display including a multibeam diffraction grating-based backlight in an example, according to an embodiment consistent with the principles described herein.

FIG. 5 illustrates a cross sectional view of a head-tracking multiview display 100 including a multibeam diffraction grating-based backlight 110 in an example, according to an embodiment consistent with the principles described herein. The multibeam diffraction grating-based backlight 110 illustrated in FIG. 5 is configured to provide a plurality of coupled-out light beams 112 having different principal angular directions from one another (e.g., as a light field). In particular, as illustrated, the provided plurality of coupled-out light beams 112 are directed away from the multibeam diffraction grating-based backlight 110 in different principal angular directions corresponding to respective view directions of the head-tracking multiview display 100, according to various embodiments. Further, as described above, the coupled-out light beams 112 may be modulated using light valves of a light valve array 120 (also illustrated), as described above, to facilitate the display of information having 3D content as a multiview image.

As illustrated in FIG. 5, the multibeam diffraction grating-based backlight 110 comprises a light guide 114. The light guide 114 may be a plate light guide, according to some embodiments. The light guide 114 is configured to guide light along a length of the light guide 114 as guided light 104, for example having a direction indicated by bold arrows 103. The light guide 114 may include a dielectric material configured as an optical waveguide, for example. The dielectric material may have a first refractive index that is greater than a second refractive index of a medium surrounding the dielectric optical waveguide. The difference in refractive indices is configured to facilitate total internal reflection of the guided light 104 according to one or more guided modes of the light guide 114.

In some embodiments, the light guide 114 may be a slab or plate optical waveguide comprising an extended, substantially planar sheet of optically transparent, dielectric material. According to various examples, the optically transparent material of the light guide 114 may include or be made up of any of a variety of dielectric materials including, but not limited to, one or more of various types of glass (e.g., silica glass, alkali-aluminosilicate glass, borosilicate glass, etc.), one or more substantially optically transparent plastics or polymers (e.g., poly(methyl methacrylate) or 'acrylic glass', polycarbonate, etc.) or a combination thereof. In some examples, the light guide 114 may further include a cladding layer (not illustrated) on at least a portion of a surface (e.g., one or both of the top surface and the bottom surface) of the light guide 114. The cladding layer may be used to further facilitate total internal reflection, according to some examples.

Further, according to some embodiments, the light guide 114 is configured to guide the guided light 104 at a non-zero propagation angle between a first surface 114' (e.g., 'front' surface or side) and a second surface 114" (e.g., 'back' surface or side) of the light guide 114. The guided light 104 may propagate by reflecting or 'bouncing' between the first surface 114' and the second surface 114" of the light guide 114 at the non-zero propagation angle (albeit in the a propagation direction indicated by the bold arrows 103). In some embodiments, a plurality of beams of the guided light 104 comprising different colors of light may be guided by the light guide 114 at respective ones of different color-specific, non-zero propagation angles. Note that the non-zero propagation angle is not illustrated in FIG. 5 for simplicity of illustration.

As defined herein, a 'non-zero propagation angle' is an angle $\gamma$ relative to a surface (e.g., the first surface 114' or the second surface 114") of the light guide 114. Further, the non-zero propagation angle is both greater than zero and less than a critical angle of total internal reflection within the light guide 114, in accordance with the principles described herein. For example, the non-zero propagation angle of the guided light 104 may be between about ten (10) degrees and about fifty (50) degrees or, in some examples, between about twenty (20) degrees and about forty (40) degrees, or between about twenty-five (25) degrees and about thirty-five (35) degrees. For example, the non-zero propagation angle may be about thirty (30) degrees. In other examples, the non-zero propagation angle may be about 20 degrees, or about 25 degrees, or about 35 degrees. Moreover, a specific non-zero propagation angle may be chosen (e.g., arbitrarily) for a particular implementation as long as the specific non-zero propagation angle is chosen to be less than the critical angle of total internal reflection within the light guide 114.

The guided light 104 in the light guide 114 may be introduced or coupled into the light guide 114 at the non-zero propagation angle (e.g., about 30-35 degrees). One or more of a lens, a mirror or similar reflector (e.g., a tilted collimating reflector), and a prism (not illustrated) may facilitate coupling light into an input end of the light guide 114 as the guided light 104 at the non-zero propagation angle, for example. Once coupled into the light guide 114, the guided light 104 propagates along the light guide 114 in a direction that may be generally away from the input end (e.g., illustrated by bold arrows 103 pointing along an x-axis in FIG. 5).

Further, the guided light 104 or equivalently a guided light beam produced by coupling light into the light guide 114 may be a collimated beam of light, according to some embodiments. Herein, a 'collimated light' or 'collimated light beam' is generally defined as a beam of light in which rays of the light beam are substantially parallel to one another within the light beam (e.g., the guided light 104). Further, rays of light that diverge or are scattered from the collimated light beam are not considered to be part of the collimated light beam, by definition herein. In some embodiments, the multibeam diffraction grating-based backlight 110 may include a collimator, such as a lens, reflector or mirror, as described above, (e.g., tilted collimating reflector) to collimate the light, e.g., from a light source. In some embodiments, the light source comprises a collimator. The collimated light provided to the light guide 114 is a collimated light beam to be guided.

As illustrated in FIG. 5, the multibeam diffraction grating-based backlight 110 further comprises a plurality of multibeam diffraction gratings 116 spaced apart from one another along the light guide length. In particular, the multibeam diffraction gratings 116 of the plurality are separated from one another by a finite space and represent individual, distinct elements along the light guide length. That is, by definition herein, the multibeam diffraction gratings 116 of the plurality are spaced apart from one another according to a finite (i.e., non-zero) inter-element distance (e.g., a finite center-to-center distance). Further the multibeam diffraction gratings 116 of the plurality generally do not intersect, overlap or otherwise touch one another. That is, each multibeam diffraction grating 116 of the plurality is generally distinct and separated from other ones of the multibeam diffraction gratings 116.

According to some embodiments, the multibeam diffraction gratings 116 of the plurality may be arranged in either a one-dimensional (1D) array or two-dimensional (2D) array. For example, the plurality of multibeam diffraction gratings 116 may be arranged as a linear 1D array. In another example, the plurality of multibeam diffraction gratings 116 may be arranged as a rectangular 2D array or as a circular 2D array. Further, the array (i.e., 1D or 2D array) may be a regular or uniform array, in some examples. In particular, an inter-element distance (e.g., center-to-center distance or spacing) between the multibeam diffraction gratings 116 may be substantially uniform or constant across the array. In other examples, the inter-element distance between the multibeam diffraction gratings 116 may be varied one or both of across the array and along the length of the light guide 114.

In accordance with the principles described herein, a multibeam diffraction grating 116 of the plurality is configured to couple out a portion of the guided light 104 as the plurality of coupled-out light beams 112. In particular, FIG. 5 illustrates the coupled-out light beams 112 as a plurality of diverging arrows depicted as being directed way from the first (or front) surface 114' of the light guide 114.

As illustrated in FIG. 5, the multibeam diffraction grating-based backlight 110 may further comprise a light source 118, in some embodiments. The light source 118 is configured to provide the light to be guided within light guide 114 at a non-zero propagation angle. In particular, the light source 118 may be located adjacent to an entrance surface or end (input end) of the light guide 114. In various embodiments, the light source 118 may comprise substantially any source of light (e.g., optical emitter), e.g., as provided above including, but not limited to, one or more light emitting diodes (LEDs) or a laser (e.g., laser diode). In some embodiments, the light source 118 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In other embodiments, the light source 118 may be a substantially broadband light source configured to provide substantially broadband or polychromatic light. For example, the light source 118 may provide white light. In some embodiments, the light source 118 may comprise a plurality of different optical emitters configured to provide different colors of light. The different optical emitters may be configured to provide light having different, color-specific, non-zero propagation angles of the guided light 104 corresponding to each of the different colors of light.

In some embodiments, the light source 118 may further comprise a collimator. The collimator may be configured to receive substantially uncollimated light from one or more of the optical emitters of the light source 118. The collimator is further configured to convert the substantially uncollimated light into collimated light. In particular, the collimator may provide collimated light having the non-zero propagation angle and being collimated according to a predetermined collimation factor, according to some embodiments. Moreover, when optical emitters of different colors are employed, the collimator may be configured to provide the collimated light having one or both of different, color-specific, non-zero propagation angles and having different color-specific collimation factors. The collimator is further configured to communicate the collimated light beam to the light guide 114 to propagate as the guided light 104, described above.

Figure 6A:
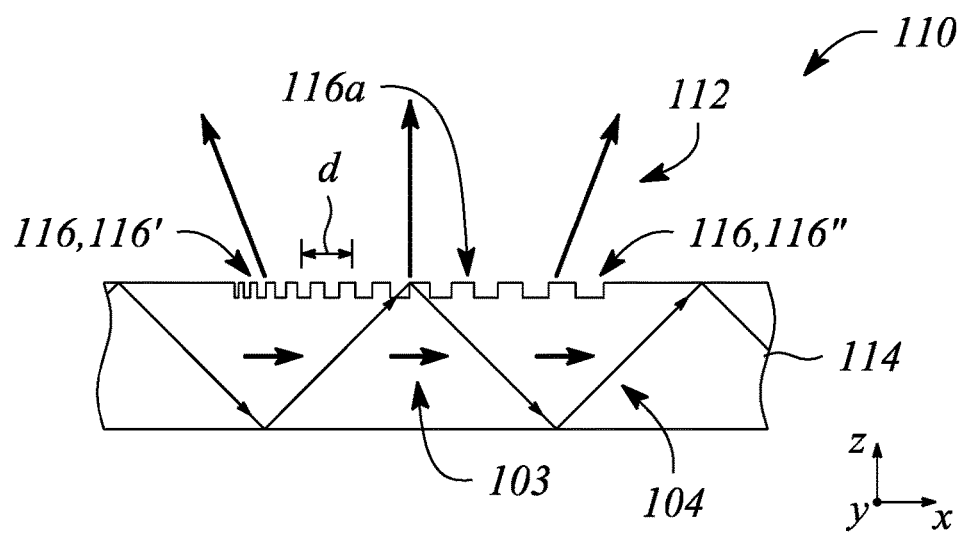
FIG. 6A illustrates a cross sectional view of a portion of a multibeam diffraction grating-based backlight with a multibeam diffraction grating in an example, according to an embodiment consistent with the principles described herein.
Figure 6B:
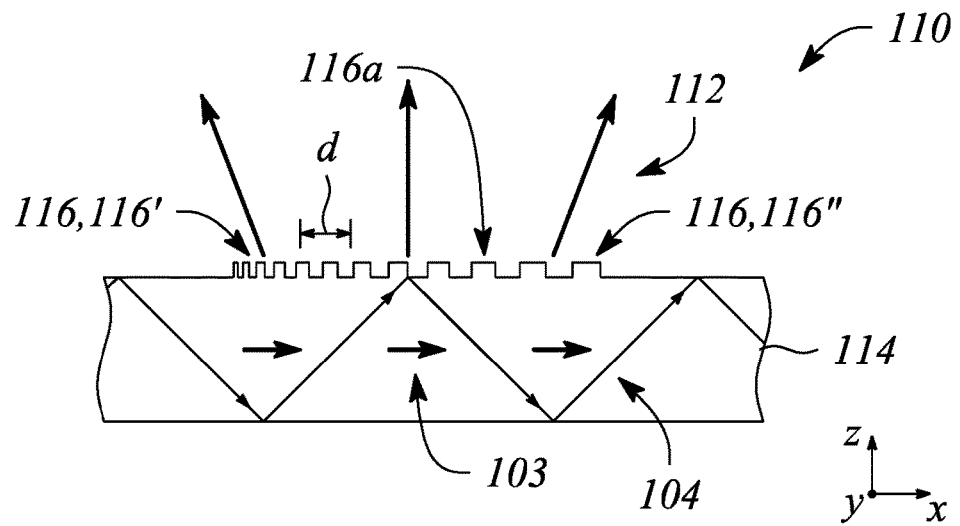
FIG. 6B illustrates a cross sectional view of a portion of a multibeam diffraction grating-based backlight with a multibeam diffraction grating in an example, according to another embodiment consistent with the principles described herein.
Figure 6C:
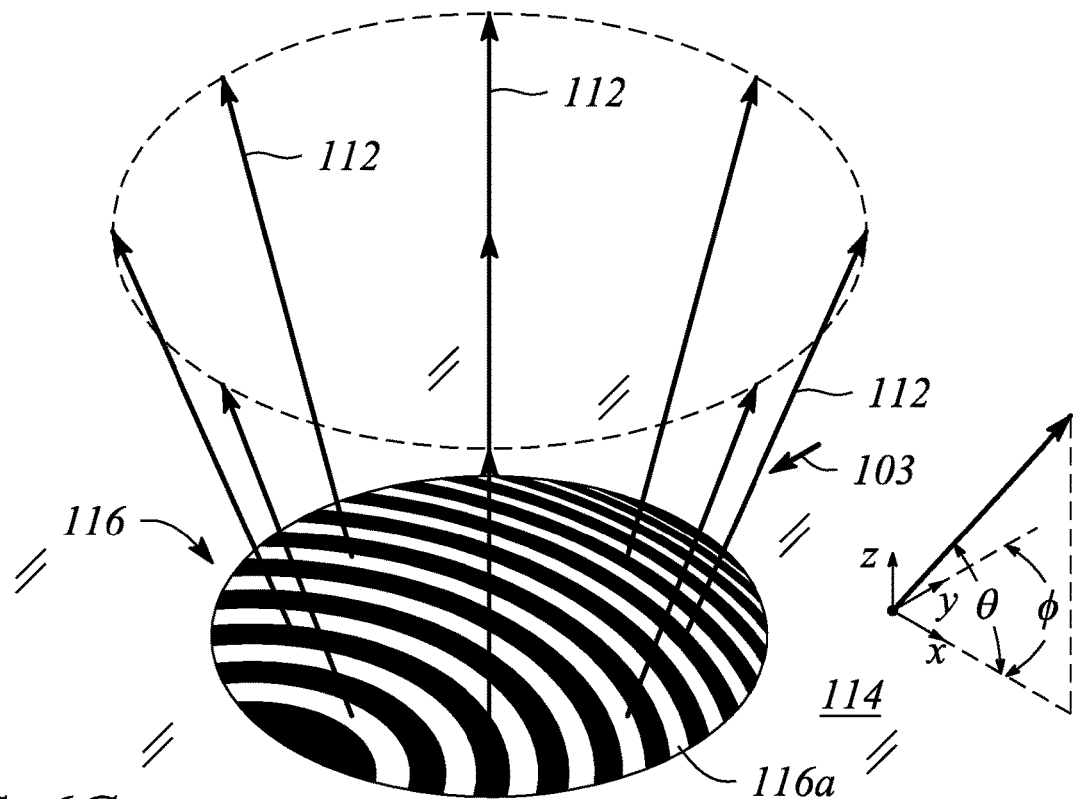
FIG. 6C illustrates a perspective view of the multibeam diffraction grating-based backlight portion of either FIG. 6A or FIG. 6B including the multibeam diffraction grating in an example, according to an embodiment consistent with the principles described herein.

FIG. 6A illustrates a cross sectional view of a portion of a multibeam diffraction grating-based backlight 110 with a multibeam diffraction grating 116 in an example, according to an embodiment consistent with the principles described herein. FIG. 6B illustrates a cross sectional view of a portion of a multibeam diffraction grating-based backlight 110 with a multibeam diffraction grating 116 in an example, according to another embodiment consistent with the principles described herein. FIG. 6C illustrates a perspective view of the multibeam diffraction grating-based backlight portion of either FIG. 6A or FIG. 6B including the multibeam diffraction grating 116 in an example, according to an embodiment consistent with the principles described herein. The multibeam diffraction grating 116 illustrated in FIG. 6A comprises grooves in a surface of a light guide 114, by way of example and not limitation. FIG. 6B illustrates the multibeam diffraction grating 116 comprising ridges protruding from the light guide surface. A plurality of light beams 112 (i.e., diffractively couple-out light beams) and guided light 104 propagating in a direction indicated by bold arrows 103 are also variously illustrated in FIGS. 6A-6C.

As illustrated in FIGS. 6A-6C, the multibeam diffraction grating 116 is a chirped diffraction grating. In particular, as illustrated in FIGS. 6A-6B, the diffractive features 116a are closer together at a first end 116' of the multibeam diffraction grating 116 than at a second end 116". Further, the diffractive spacing d of the illustrated diffractive features 116a varies from the first end 116' to the second end 116". In some examples, the chirped diffraction grating of the multibeam diffraction grating 116 may have or exhibit a chirp of the diffractive spacing d that varies linearly with distance. As such, the chirped diffraction grating of the multibeam diffraction grating 116 may be referred to as a 'linearly chirped' diffraction grating.

In another example (not illustrated), the chirped diffraction grating of the multibeam diffraction grating 116 may exhibit a non-linear chirp of the diffractive spacing d. Various non-linear chirps that may be used to realize the chirped diffraction grating include, but are not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be used in the multibeam diffraction grating 116.

As illustrated by way of example in FIG. 6C, the multibeam diffraction grating 116 includes diffractive features 116a (e.g., grooves or ridges) in, at or on a surface of the light guide 114 that are both chirped and curved (i.e., the multibeam diffraction grating 116 is a curved, chirped diffraction grating, as illustrated). Guided light that is guided in a light guide 114 has an incident direction relative to the multibeam diffraction grating 116 and the light guide 114, as illustrated by a bold arrow 103 in FIG. 6C (also in FIGS. 6A and 6B). Also illustrated is the plurality of coupled-out or emitted light beams 112 pointing away from the multibeam diffraction grating 116 at the surface of the light guide 114. The illustrated light beams 112 are emitted in a plurality of different predetermined principal angular directions. In particular, the different predetermined principal angular directions of the emitted light beams 112 are different in both azimuth and elevation (e.g., to form a light field), as illustrated.

According to various embodiments, one or both the predefined chirp of the diffractive features 116a and the curve of the diffractive features 116a may be responsible for a respective plurality of different predetermined principal angular directions of the emitted light beams 112. For example, due to the diffractive feature curve, the diffractive features 116a within the multibeam diffraction grating 116 may have varying orientations relative to an incident direction of the guided light 104 that is guided in the light guide 114. In particular, an orientation of the diffractive features 116a at a first point or location within the multibeam diffraction grating 116 may differ from an orientation of the diffractive features 116a at another point or location relative to the guided light incident direction. With respect to the coupled-out or emitted light beam 112, an azimuthal component $\phi$ of the principal angular direction $\{\theta, \phi\}$ of the light beam 112 may be determined by or correspond to the azimuthal orientation angle $\phi_f$ of the diffractive features 116a at a point of origin of the light beam 112 (i.e., at a point where the incident guided light 104 is coupled out), according to some embodiments. As such, the varying orientations of the diffractive features 116a within the multibeam diffraction grating 116 produce different light beams 112 having different principal angular directions $\{\theta, \phi\}$, at least in terms of their respective azimuthal components $\phi$.

In particular, at different points along the curve of the diffractive features 116a, an 'underlying diffraction grating' of the multibeam diffraction grating 116 associated with the curved diffractive features 116a has different azimuthal orientation angles $\phi_f$. By 'underlying diffraction grating', it is meant that diffraction gratings of a plurality of non-curved diffraction gratings in superposition yield the curved diffractive features 116a of the multibeam diffraction grating 116. Thus, at a given point along the curved diffractive features 116a, the curve has a particular azimuthal orientation angle $\phi_f$ that generally differs from the azimuthal orientation angle $\phi_f$ at another point along the curved diffractive features 116a. Further, the particular azimuthal orientation angle $\phi_f$ results in a corresponding azimuthal component $\phi$ of a principal angular direction $\{\theta, \phi\}$ of a light beam 112 emitted from the given point. In some examples, the curve of the diffractive features 116a (e.g., grooves, ridges, etc.) may represent a section of a circle. The circle may be coplanar with the light guide surface. In other examples, the curve may represent a section of an ellipse or another curved shape, e.g., that is coplanar with the light guide surface.

In other examples (not illustrated), the multibeam diffraction grating 116 may include diffractive features 116a that are 'piecewise' curved. In particular, while the diffractive feature 116a may not describe a substantially smooth or continuous curve per se, at different points along the diffractive feature 116a within the multibeam diffraction grating 116, the diffractive feature 116a still may be oriented at different angles with respect to the incident direction of the guided light 104. For example, the diffractive feature 116a may be a groove including a plurality of substantially straight segments, each segment having a different orientation than an adjacent segment. Together, the different angles of the segments may approximate a curve (e.g., a segment of a circle), according to various embodiments. In yet other examples, the diffractive features 116a may merely have different orientations relative to the incident direction of the guided light at different locations within the multibeam diffraction grating 116 without approximating a particular curve (e.g., a circle, an ellipse, or a curve having a hyperbolic shape).

Figure 7A:
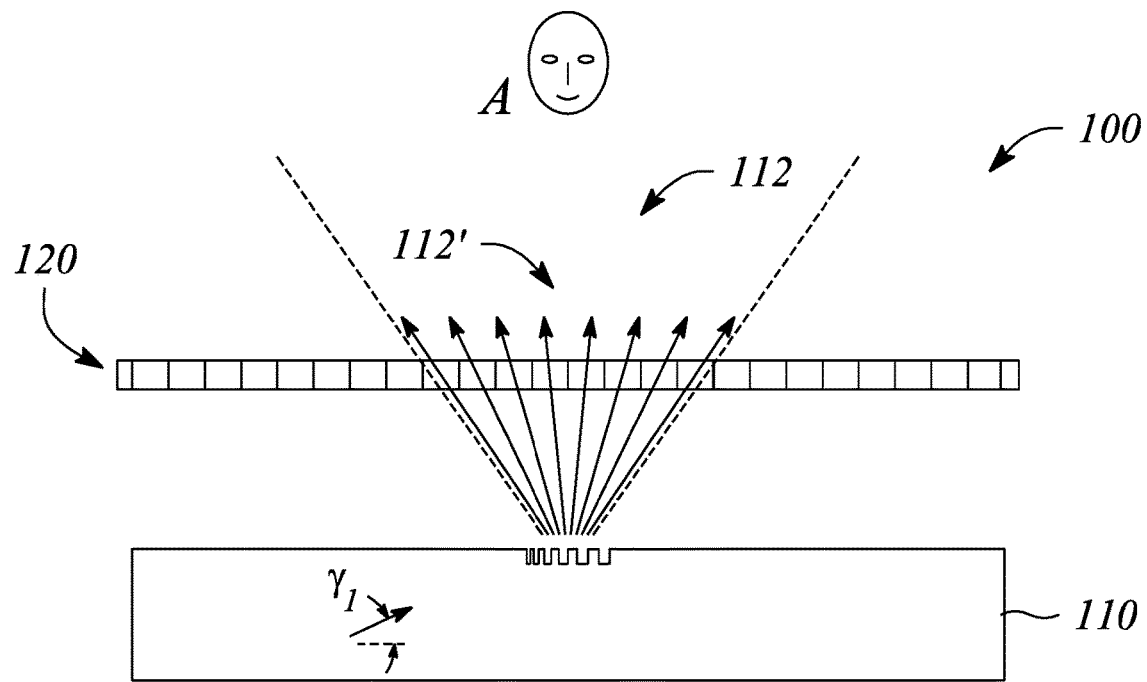
FIG. 7A illustrates a cross sectional view of a head-tracking multiview display in an example, according to an embodiment consistent with the principles described herein.
Figure 7B:
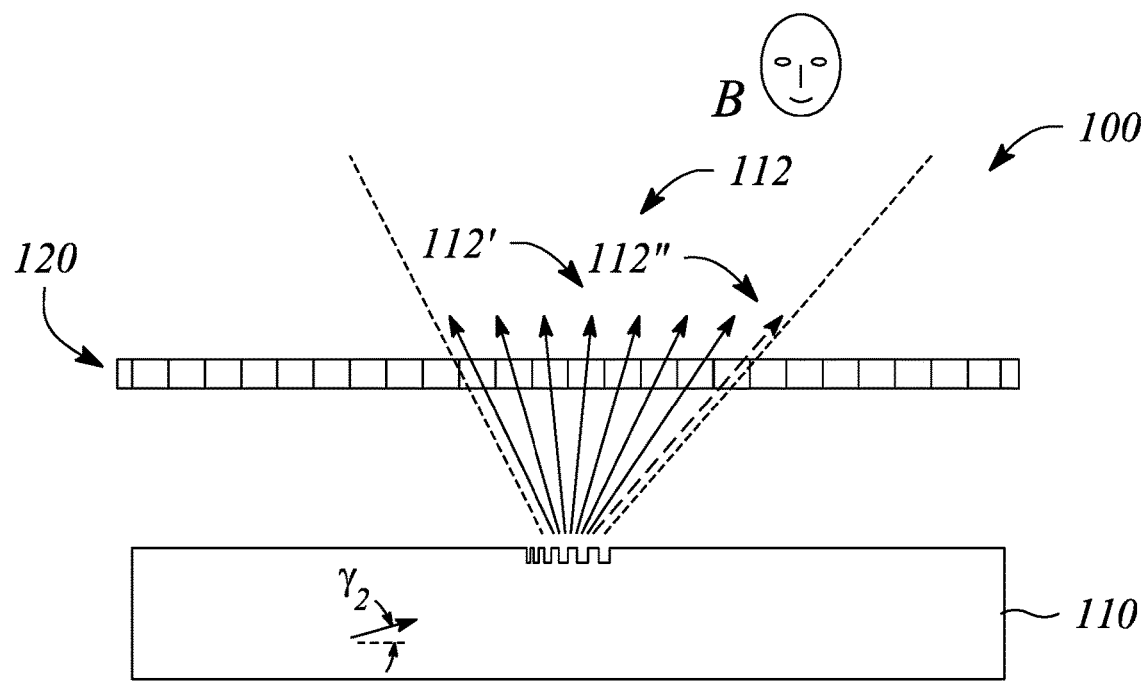
FIG. 7B illustrates a cross sectional view of the head-tracking multiview display of FIG. 7A in another example, according to an embodiment consistent with the principles described herein.

In some embodiments, the non-zero propagation angle of the guided light may be configured to adjust an emission pattern of the plurality of light beams 112 in the head-tracking multiview display 100. In particular, the non-zero propagation angle may be configured to tilt (or selectively direct) the emission pattern toward a user. For example, a first non-zero propagation angle may be configured to provide an emission pattern of the light beams 112 that is substantially directed toward the user in the first position A and a second non-zero propagation angle may be configured to direct the emission pattern toward the user in the second position B, as described above with respect to FIGS. 4A-4B, for example. FIGS. 7A-7B provide another example of head-tracking emission patterns.

FIG. 7A illustrates a cross sectional view of a head-tracking multiview display 100 in an example, according to an embodiment consistent with the principles described herein. FIG. 7B illustrates a cross sectional view of the head-tracking multiview display 100 of FIG. 7A in another example, according to an embodiment consistent with the principles described herein. FIGS. 7A and 7B illustrate examples of different emission patterns of coupled-out light beams 112 based on different non-zero propagation angles of guided light within a light guide of a multibeam backlight. In FIGS. 7A-7B, the head-tracking multiview display 100 comprises a multibeam diffraction grating-based backlight 110 and a light valve array 120. In some embodiments, the head-tracking multiview display 100 is substantially similar to the head-tracking multiview display 100 described above with respect to FIG. 5. For example, the multibeam diffraction grating-based backlight 110 is configured to provide to the light valve array 120 the plurality of light beams 112 having an emission pattern delineated by dashed lines, as provided in FIGS. 7A-7B.

In FIG. 7A, a user is located at a first position A, which is substantially in front of (i.e., centrally located with respect to a center of) the light valve array 120 or a center of the head-tracking multiview display 100. The emission pattern from the head-tracking multiview display 100 is configured to point (e.g., without a tilt) substantially toward the user at the first position A. For example, the guided light 104 in the light guide 114 of multibeam diffraction grating-based backlight 110 may propagate at a first non-zero propagation angle $\gamma_1$ to point or direct the emission pattern toward the first position A, as illustrated in FIG. 7A.

In FIG. 9B, the user has moved to or is located at a second position B, which is substantially off to side of (i.e., not centrally located with respect to the center of) the light valve array 120 or the center of the head-tracking multiview display 100 compared to position A (e.g., at an oblique angle). The emission pattern of the plurality of light beams 112 illustrated in FIG. 9B is tilted relative to the emission pattern with respect to the first position A, and thus configured to point substantially towards the user at the second position B. In this example, the guided light 104 in the light guide 114 may propagate at a second non-zero propagation angle $\gamma_2$ to provide the tilt to the emission pattern toward the second position B, as illustrated in FIG. 7B.

In various embodiments, the emission pattern directed toward the first position A includes a first set of light beams 112' corresponding to a primary view set (i.e., provided by the first non-zero propagation angle $\gamma_1$ of the guided light). Moreover, the tilted emission pattern that is tilted toward the second position B may include a subset of the first set of light beams 112' corresponding to the primary view set and a light beam 112" corresponding to a secondary view, (i.e., provided by the second non-zero propagation angle $\gamma_2$ of the guided light). The tilted emission pattern may represent the augmented view set, described above.

In some embodiments, the multibeam diffraction grating-based backlight 110 is configured to be substantially transparent to light in a direction through the light guide 114 orthogonal to the propagation direction (i.e., bold arrow 103) of the guided light 104. In particular, the light guide 114 and the spaced apart plurality of multibeam diffraction gratings 116 allow light to pass through the light guide 114 and specifically through both the first surface 114' and the second surface 114", in some embodiments (e.g., see FIG. 5). Transparency may be facilitated, at least in part, due to both the relatively small size of the multibeam diffraction gratings 116 and a relative large inter-element spacing of the multibeam diffraction grating 116.

In accordance with some embodiments of the principles described herein, a head-tracking multiview display system is provided. The head-tracking multiview display system is configured to provide or to 'display' a 3D or multiview image representing a scene. In particular, the multiview image is provided as a plurality of different 'views' associated with the multiview image. The different views may provide a 'glasses free' (e.g., autostereoscopic) representation of information in the multiview image being displayed, for example. Moreover, different sets of views may be provided for different locations or positions (e.g., head locations) of a user of the head-tracking multiview display system, according to various embodiments.

Figure 8:
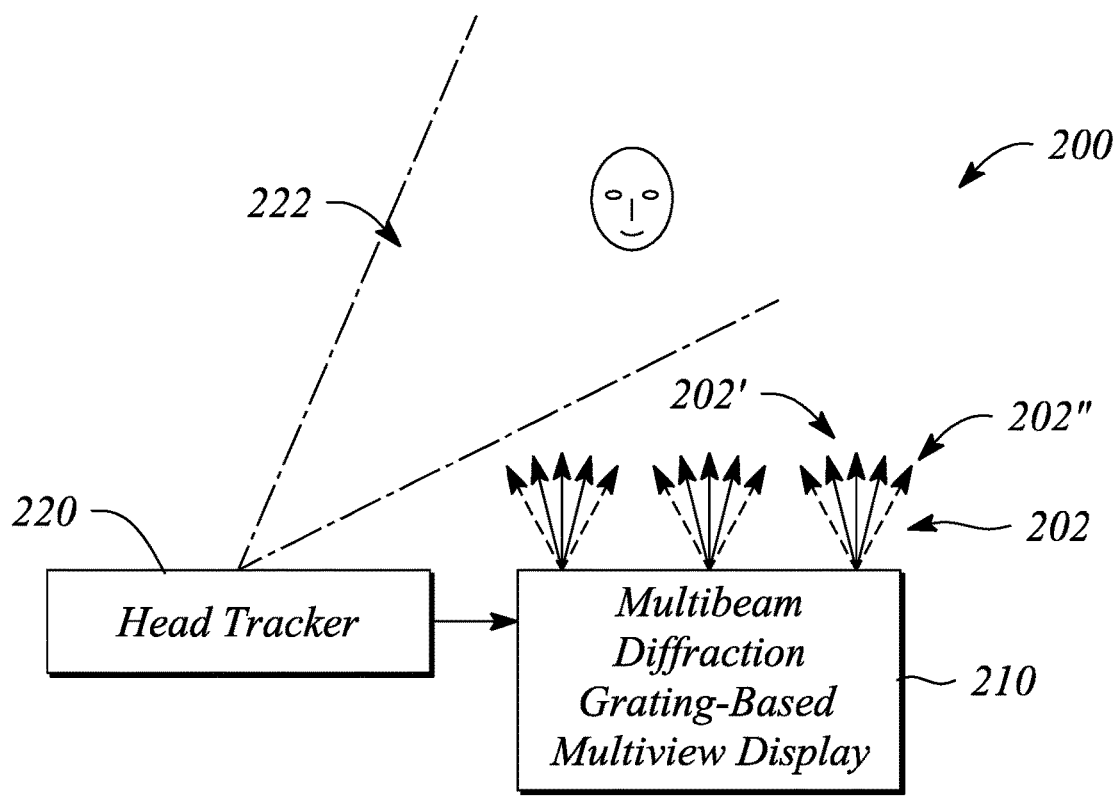
FIG. 8 illustrates a block diagram of a head-tracking multiview display system in an example, according to an embodiment consistent with the principles described herein.

FIG. 8 illustrates a block diagram of a head-tracking multiview display system 200 in an example, according to an embodiment consistent with the principles described herein. The head-tracking multiview display system 200 is configured to display a multiview image according to different views in different view directions. In particular, light beams emitted by the head-tracking multiview display system 200 are used to display a multiview image and may correspond to pixels of the different views (i.e., view pixels). The different views or equivalently different view directions are illustrated as arrows 202 emanating from the head-tracking multiview display system 200 in FIG. 8. As provided below, the arrows 202 also represent the light beams emitted by the head-tracking multiview display system 200.

The head-tracking multiview display system 200 illustrated in FIG. 8 comprises a multibeam diffraction grating-based multiview display 210. The multibeam diffraction grating-based multiview display 210 is configured to provide a plurality of views (e.g., arrows 202) of a scene as the multiview image. According to various embodiments, the plurality of views comprises a set of primary views of the scene and a secondary view representing a scene perspective angularly adjacent to the primary view set. The secondary view (or a plurality of secondary views, in some embodiments) may be combined with a sub-set of the views of the primary view set to provide an augmented set of views, as described herein. In addition, the primary view set, the secondary view and the augmented view set of the head-tracking multiview display system 200 may be substantially similar to the corresponding view sets and views described above with respect to the above-described head-tracking multiview display 100, according to some embodiments. In FIG. 8, the primary views are represented by solid-line arrows 202' and the secondary view is represented by a dashed-line arrow 202".

In some embodiments, the multibeam diffraction grating-based multiview display 210 may be substantially similar to the above-described head-tracking multiview display 100, according to some embodiments. For example, the multibeam diffraction grating-based multiview display 210 may comprise a multibeam diffraction grating-based backlight configured to provide a plurality of emitted or diffractively coupled-out light beams having different principal angular directions corresponding to the different view directions of the plurality of views. The multibeam diffraction grating-based multiview display 210 may further comprise a light valve array configured to modulate the plurality of coupled-out light beams to provide the plurality of views, for example. Moreover, the multibeam diffraction grating-based multiview display 210 may further comprise a light source, such as the light source 118 described above with respect to the head-tracking multiview display 100.

According to some of these embodiments, the multibeam diffraction grating-based multibeam backlight of the head-tracking multiview display system 200 may be substantially similar multibeam diffraction grating-based backlight 110, described above. For example, the multibeam diffraction grating-based backlight may comprise a light guide configured to guide light in a propagation direction along a length of the light guide and further comprise an array of multibeam diffraction gratings spaced apart from one another along the light guide length. A multibeam diffraction grating of the multibeam diffraction grating array may be configured to diffractively couple out from the light guide a portion of the guided light as the plurality of coupled-out light beams having the different principal angular directions. The multibeam diffraction gratings of the multibeam diffraction grating array may be substantially similar to the multibeam diffraction gratings 116 and the light guide may be substantially similar to the light guide 114, for example.

Referring again to FIG. 8, head-tracking multiview display system 200 further comprises a head tracker 220. The head tracker 220 is configured to determine a position a user relative to the multibeam diffraction grating-based multiview display 210. At a first determined position, the multibeam diffraction grating-based multiview display 210 is configured to provide the set of primary views. Further, at a second determined position, the multibeam diffraction grating-based multiview display 210 is configured to provide an augmented set of views comprising the secondary view and a subset of the views of the primary view set. As illustrated in FIG. 8, the head tracker 220 may be configured to track a location of the user (e.g., of a user's head) in a region 222 in front of the multibeam diffraction grating-based multiview display 210 delineated by dash-dot lines. By 'in front of' is meant adjacent to a light emitting surface or an image view screen of the multibeam diffraction grating-based multiview display 210.

According to various embodiments, any of a variety of devices, systems and circuits that provide head tracking (or equivalently tracking of a user's position) may be employed as the head tracker 220 of the head-tracking multiview display system 200. For example, in some embodiments, the head tracker 220 may comprise a camera configured to capture an image of the user relative to the view screen of the multibeam diffraction grating-based multiview display 210. Further, the head tracker 220 may comprise an image processor (or general purpose computer programmed as an image processor) configured to determine a position of the user within the captured image relative to the view screen of the multibeam diffraction grating-based multiview display 210. The determined position may correspond to one of the first determined position A and the second determined position B, described above, for example. The user's position relative to the view screen of the multibeam diffraction grating-based multiview display 210 may be determined from the captured image by the image processor using various techniques including, but not limited to, image recognition or pattern matching, for example. An output of the head tracker 220 may be used to modify an operation (e.g., modulation of light beams by the light valve array) of the multibeam diffraction grating-based multiview display 210. For example, the determined position of the user may be provided to one or both of a processor and a light valve driver (e.g., driver circuit) of the multibeam diffraction grating-based multiview display 210 to adjust the emission pattern from the multibeam diffraction grating-based multiview display 210 to correspond to the user's position. Other examples of the head tracker 220 implementations may include any of a variety of two-dimensional (2D) and three-dimension (3D) object tracking systems such as, but not limited to, KINECT® object tracking system. KINECT® is a registered trademark of Microsoft Corporation, Redmond, Wash.

As mentioned above, in some embodiments, the multibeam diffraction grating-based multiview display 210 of the head-tracking multiview display system 200 may further comprise a light source. The light source is configured to act as a source of light for the multibeam diffraction grating-based multiview display 210. In particular, in some of these embodiments (not illustrated in FIG. 8), the light source may be configured to provide the light to the light guide with a non-zero propagation angle, for example. In some embodiments, the light source may be further configured to tilt an emission pattern of the light emitted by the multibeam diffraction grating-based multiview display 210 toward the user in response to an input from the head tracker 220. The emission pattern tilt, or equivalently a 'tilt angle' of the emitted light, corresponds to the determined position of the user by the head tracker 220 in these embodiments. For example, the light source may be a light source used to illuminate the light guide of the multibeam diffraction grating-based backlight. An angle of light propagating within the light guide, as provided by the light source, may in turn determine a tilt angle of light beams emitted by the multibeam diffraction grating-based backlight. The emission angle tilt may either facilitate or enhance production of the secondary view, according to some embodiments.

Figure 9:
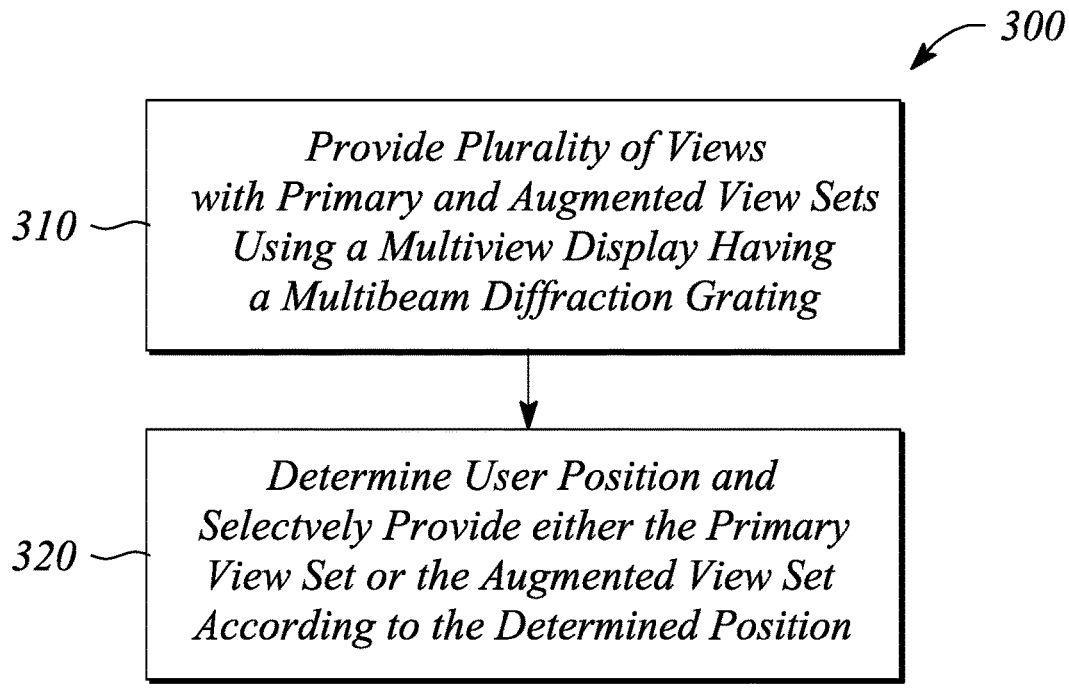
FIG. 9 illustrates a flow chart of a method of multiview display operation employing head tracking in an example, according to an embodiment consistent with the principles described herein.

In accordance with other embodiments of the principles described herein, a method of multiview display operation employing head tracking is provided. FIG. 9 illustrates a flow chart of a method 300 of multiview display operation employing head tracking in an example, according to an embodiment consistent with the principles described herein. As illustrated in FIG. 9, the method 300 of multiview display operation employing head tracking comprises providing 310 a plurality of views of a scene using a multiview display. According to various embodiments, the plurality of views comprises a set of primary views of the scene and a secondary view representing a scene perspective angularly adjacent to the primary view set.

The multiview display used in providing 310 a plurality of views comprises a multibeam diffraction grating array optically coupled to a light guide. In some embodiments, the multiview display may be substantially similar to the multibeam diffraction grating-based multiview display 210 described above with respect to the head-tracking multiview display system 200, in some embodiments. Moreover, in some embodiments, a multibeam diffraction grating of the multibeam diffraction grating array may be substantially similar to the multibeam diffraction grating 116 described above with respect to the head-tracking multiview display 100. For example, the multibeam diffraction grating may comprise a chirped diffraction grating. The multibeam diffraction grating may also have having curved diffractive features, for example.

In some embodiments, the multiview display further comprises a light guide. In these embodiments, providing 310 a plurality of views may comprise guiding light in a propagation direction along a length of the light guide. The light guide may be a plate light guide, for example. In these embodiments, the multibeam diffraction grating array is optically coupled to the light guide. Providing 310 a plurality of views further comprises diffractively coupling a portion of the guided light out of the light guide using the multibeam diffraction grating to provide a plurality of coupled-out light beams having different principal angular directions corresponding to respective different view directions of the multiview display.

In some embodiments, providing 310 a plurality of views further comprises modulating the coupled-out light beams using a plurality of light valves to provide the plurality of views of the scene as a multiview image. For example, the multiview display may further comprise the plurality of light valves. The light valves may be arranged in an array adjacent to a surface of the light guide with the multibeam diffraction grating array, for example. The light valves may be substantially similar to light valves of the light valve array 120 of the above-described head-tracking multiview display 100, in some embodiments. In some embodiments, the light valves of the plurality may comprise liquid crystal light valves, for example.

As illustrated in FIG. 9, the method 300 of multiview display operation employing head tracking further comprises determining 320 a position of a user relative to the multiview display and selecting a view set to display or provide to the user according to the determined user position. According to various embodiments, the primary view set is selected for a determined first position of the user and an augmented set of views is selected for a determined second position of the user. By definition herein, the augmented set of views comprises the secondary view and a subset of the views of the primary view set. The multiview display provides the primary view set and the augmented view set according to the determined position and the view selection in accordance with the method 300 of multiview display operation employing head tracking.

In other words, the method 300 of multiview display operation determines 320 the user's position relative the multiview display (or relative to a screen of or views provided by the multiview display). The method 300 of multiview display operation selectively provides either the primary view set or the augmented set of views depending on whether the user is determined 320 to be in the first position or second position. In particular, when the user is determined to be in the first position (e.g., in front of the multiview display), the multiview display provides the set of primary views. Moreover, when the user is determined 320 to be in the second position (e.g., substantially off to a side of the multiview display), the multiview display provides the augmented view set that includes the secondary view. As such, the multiview display adapts or adjusts the provided 310 plurality of views to include either the primary view set or the augmented view set depending on the determined 320 position of the user.

In some embodiments, determining 320 a position of a user comprises using a head tracker. In some of these embodiments, the head tracker may be substantially similar to the head tracker 220 of the head-tracking multiview display system 200. For example, the head tracker may comprise a camera and an image processor. In this example, determining 320 a position of the user may comprise capturing an image of the user using the camera; and establishing a location of the user within the captured image using the image processor. According to various embodiments, the established location is the determined 320 position. For example, the established location may correspond to one of the determined first position and the determined second position.

In some embodiments (not illustrated), the method 300 of multiview display operation further comprises tilting (or selectively directing) an emission pattern of light emitted by the multiview display to correspond to the determined position of the user. The emission pattern may include light beams corresponding a particular set of views, e.g., the primary view set or the augmented view set. The emission pattern may be tilted to point either substantially toward the user in the determined first position or substantially toward the user in the determined second position. In some embodiments, tilting the emission pattern may be provided by selectively controlling a non-zero propagation angle of light within the light guide of the multiview display. For example, a first non-zero propagation angle may provide an emission pattern of the light beams that is substantially directed toward the user in the first position and a second non-zero propagation angle may provide the emission pattern substantially directed toward the user in the second position. As described above, the user positions may be determined 320 and thus the control or selection of the non-zero propagation angle may be provided using an output of a head tracker, for example. Moreover, in some embodiments, tilting an emission pattern of light emitted by the multiview display comprises using one or both of a light source and a collimator to provide light at a respective non-zero propagation angle to the light guide as the guided light. In some examples, the light source is substantially similar to the light source 118 described above with respect to the head-tracking multiview display 100.

Thus, there have been described examples and embodiments of a head-tracking multiview display, a head-tracking multiview display system, and a method of multiview display operation employing head tracking that employ a multibeam diffraction grating-based display to provide both a set of primary views and an augmented set of views to a user. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A head-tracking multiview display comprising:
a multibeam diffraction grating-based backlight configured to provide a plurality of light beams having different principal angular directions corresponding to different view directions of a multiview image; and
a light valve array configured to modulate the plurality of light beams to provide a plurality of views of a scene as the multiview image, the view plurality comprising a set of primary views and a secondary view representing a perspective view of the scene that is angularly adjacent to the primary view set,
wherein the head-tracking multiview display is configured to selectively provide either the primary view set or an augmented set of views comprising the secondary view and a subset of the views of the primary view set according to a tracked location of a user.

2. The head-tracking multiview display of claim 1, wherein the multibeam diffraction grating-based backlight comprises:
a light guide configured to guide light; and
a plurality of multibeam diffraction gratings spaced apart from one another at a surface of the light guide, a multibeam diffraction grating of the grating plurality being configured to diffractively couple out from the light guide a portion of the guided light as the plurality of light beams having the different principal angular directions.

3. The head-tracking multiview display of claim 2, wherein the multibeam diffraction grating comprises a chirped diffraction grating.

4. The head-tracking multiview display of claim 3, wherein the chirped diffraction grating has a linear chirp.

5. The head-tracking multiview display claim 2, wherein the multibeam diffraction grating comprises curved diffractive features adjacent to a surface of the light guide, the curved diffractive features comprising one of grooves and ridges that are spaced apart from one another at the light guide surface.

6. The head-tracking multiview display of claim 1, further comprising a light source optically coupled to an input of the multibeam diffraction grating-based backlight, the light source being configured to provide light to be guided in the multibeam diffraction grating-based backlight as collimated light having a non-zero propagation angle.

7. The head-tracking multiview display of claim 6, wherein the non-zero propagation angle is configured to tilt an emission pattern of the plurality of light beam toward the user.

8. A head-tracking multiview display system comprising the head-tracking multiview display of claim 1, the head-tracking multiview display system further comprising a head tracker configured to determine a position of a user's head relative to the multiview display, at a determined first position the head-tracking multiview display being configured to selectively provide the primary set of views and at a determined second position the head-tracking multiview display being configured to provide the augmented set of views.

9. The head-tracking multiview display system of claim 8, wherein the head tracker comprises:
a camera configured to capture an image of the user; and
an image processor configured to determine a position of the user within the captured image.

10. A head-tracking multiview display system comprising:
a multibeam diffraction grating-based multiview display configured to provide a plurality of views of a scene as a multiview image, the plurality of views comprising a set of primary views of the scene and a secondary view representing a scene perspective angularly adjacent to the primary view set; and a head tracker configured to determine a position of a user's head relative to the multibeam diffraction grating-based multiview display, at a determined first position the multiview display being configured to provide the set of primary views and at a determined second position the multiview display being configured to provide an augmented set of views comprising the secondary view and a subset of the views of the primary view set.

11. The head-tracking multiview display system of claim 10, wherein the multibeam diffraction grating-based multiview display comprises:

a light guide configured to guide light in a propagation direction along a length of the light guide;

an array of multibeam diffraction gratings spaced apart from one another along the light guide length, a multibeam diffraction grating of the array being configured to diffractively couple out from the light guide a portion of the guided light as a plurality of coupled-out light beams having different principal angular directions from one another; and a light valve array configured to modulate the plurality of coupled-out light beams to provide the plurality of views.

12. The head-tracking multiview display system of claim 11, wherein a multibeam diffraction grating of the array of multibeam diffraction gratings comprises a chirped diffraction grating having curved diffractive features.

13. The head-tracking multiview display system of claim 11, further comprising a light source optically coupled to an input of the light guide, the light source being configured to provide the guided light as collimated light having a non-zero propagation angle.

14. The head-tracking multiview display system of claim 13, wherein the non-zero propagation angle is configured to selectively tilt the plurality of coupled-out light beams toward a determined position of the user provided by the head tracker.

15. The head-tracking multiview display system of claim 10, wherein the head tracker comprises:

a camera configured to capture an image of the user; and
an image processor configured to determine a position of the user within the captured image,
wherein the determined position corresponds to one of the first position and the second position.

16. A method of multiview display operation employing head tracking, the method comprising:

providing a plurality of views of a scene using a multiview display that comprises an array of multibeam diffraction gratings, the plurality of views comprising a set of primary views of the scene and a secondary view representing a scene perspective angularly adjacent to the primary view set; and determining a position of a user relative to the multiview display, the multiview display providing the primary view set when the user is determined to be in a first position and providing an augmented set of views when the user is determined to be in a second position, wherein the augmented set of views comprises the secondary view and a subset of the views of the primary view set.

17. The method of multiview display operation of claim 16, wherein providing a plurality of views comprises:

guiding light in a propagation direction along a length of a light guide; and diffractively coupling a portion of the guided light out of the light guide using a multibeam diffraction grating of the multibeam diffraction grating array to provide a plurality of coupled-out light beams having different principal angular directions corresponding to respective different view directions of the multiview display; and modulating the coupled-out light beams using a plurality of light valves to provide the plurality of views of the scene as a multiview image.

18. The method of multiview display operation of claim 16, wherein a multibeam diffraction grating of the array comprises a chirped diffraction grating having curved diffractive features.

19. The method of multiview display operation of claim 16, wherein determining a position of the user comprises:

capturing an image of the user using a camera; and
determining a position of the user within the captured image using an image processor, the determined position corresponding to one of the first position and the second position.

20. The method of multiview display operation of claim 16, further comprising tilting an emission pattern of light emitted by the multiview display to correspond to the determined position of the user.

* * * * *